Oct. 24, 1939.  N. B. BERGE  2,177,202
HINGE FOR AN AUTOMOBILE BED
Filed June 19, 1936
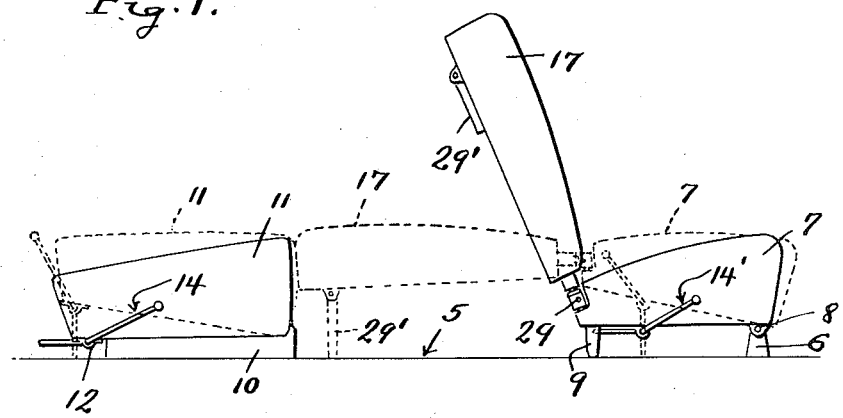
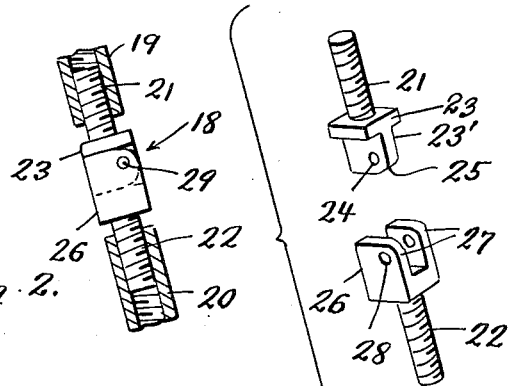
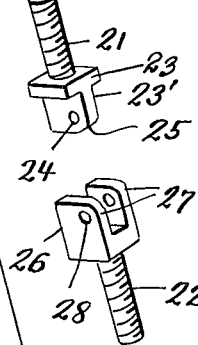
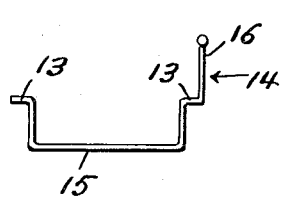
Inventor
Nels B. Berge
By Clarence A O'Brien
Hyman Berman
Attorneys Patented Oct. 24, 1939

2,177,202

UNITED STATES PATENT OFFICE 2,177,202

HINGE FOR AN AUTOMOBILE BED

Nels B. Berge, Billings, Mont., assignor of one-half to Marie Berge, Billings, Mont.

Application June 19, 1936, Serial No. 86,165

4 Claims. (Cl. 287—99)

My invention relates generally to means whereby the front and rear seat of a coach or sedan type of automobile may be utilized to form a bed in the automobile, wherein the back or backs of the front seat assembly are hinged and are utilized to bridge the space between the front seat cushion and the rear seat cushion to form a continuous sleeping surface, and an important object of my invention is to provide arrangements of the character indicated which are practical, mechanically efficient, and easily installed.

Another important object of my invention is to provide arrangements of the character indicated above which do not require any extensive alterations of the existing front and rear seat assemblies, and which involves the addition to these seat assemblies of only simple and inexpensive elements which do not in any way interfere with the usual use and operation of either seat assembly.

Other important objects of my invention will be apparent from a reading of the following description taken in connection with the drawing, wherein for purposes of illustration I have shown a preferred embodiment of my invention.

In the drawing—

Figure 1 is a general side elevational view showing the floor of the interior of an automobile with the front and rear seat assemblies spaced in the usual arrangement, and showing in dotted lines the adjusted positions of the front and rear seat cushions and of the front seat back, forming the sleeping surface or bed.

Figure 2 is a fragmentary longitudinal sectional view taken through the hinge structure of the present invention.

Figure 3 is a perspective view of the separated hinge elements.

Figure 4 is a side elevational view of the elevating crank which is used on both the front and rear seat cushions.

Referring in detail to the drawing, the numeral 5 generally refers to the floor of the automobile from the front part of which rises the bracket 6 on which the front end of the front seat cushion 7 is hinged as indicated by the numeral 8, in the conventional manner. Depending from the rear end of the front seat cushion 7 is the usual foot 9 for engaging the floor and supporting the seat cushion 7 at the usual angle.

The numeral 10 generally designates the support structure for the rear seat cushion 11 which it supports at the proper angle in a usual and conventional manner.

In accordance with the present invention I secure to the rear part of the bottom of the rear seat cushion 11 the journals 12 in which are journaled the horizontal portions 13 of the elevating crank 14, which crank includes the laterally displaced bight portion 15. One of the portions 13 is provided with an operating handle 16 which in the conventional position of the rear seat 11 occupies the inoperative position shown in full lines in Figure 1 with the top of the seat 11 declining rearwardly as is the usual arrangement. For the purposes of the present invention, the slanting top of the seat cushion 11 is brought to a level position by swinging the crank handle 16 rearwardly to the position illustrated in dotted lines in Figure 1, whereby the bight portion 15 is made to engage the floor 5 and elevate the rear end of the seat cushion 11 to the horizontal dotted line position shown.

A similar crank arrangement 14' is journaled on the bottom of the front seat cushion 7 and has the same action in leveling the ordinarily rearwardly declining top of the front seat cushion 7, so that the top of the front seat cushion 7 and the rear seat cushion 11 can be placed at the same angle and height above the floor 5.

The front seat back 17 which may be of the divided type or the solid type has its hinge connection with the rear of the front seat cushion 7 removed and replaced in accordance with the present invention by the hinge structure which is generally designated 18 and which is shown clearly in Figures 2 and 3 of the drawing.

The hinge structure 18, a suitable number of which will be utilized according to the width of the front seat assembly, comprises the interiorly threaded tubular element 19 which is fixed to the lower end of the seat back 17, the interiorly threaded tubular element 20 which is fixed to a lower part of the rear of the seat cushion 7, and the hinge members which have the respective threaded studs 21 and 22 which thread into the corresponding tubular elements 19 and 20.

The hinge member 23 is T-shaped in cross section with the stud projecting from the head thereof substantially in alignment with the standard 23' of the T. An opening 24 is formed in the standard 23' adjacent its front edge for receiving a hinge pin 29, the said front edge having its lower corner rounded as indicated by the numeral 25.

The hinge member 26 is U-shaped in cross section and has the upper corner of the front edges of its legs rounded as indicated by the numeral 27 and adjacent these corners the legs have openings 28 to receive the hinge pin 29. By means of these arrangements, the seat back 17 can be swung only forwardly from its usual position and can not be swung rearwardly of that position illustrated in full lines in Figure 1, because the bottom of the head of the hinge member 23 engages the upper ends of the legs of the hinge member 26 which positively prevents the seat back from swinging further in a backward direction. However, when it is desired to place the seat back 17 into the horizontal position illustrated in Figure 1 in dotted lines, the hinge members 23 and 26 are together rotated a half turn until the rounded edge portions 25 and 27 face to the rear, in which position of the hinge structure the seat back 17 may be swung beyond the usual position shown in full lines in Figure 1 into the horizontal position illustrated in dotted lines in Figure 1, in which position the hinged foot 29' attached to the upper part of the back of the seat back 17 comes into play to support the seat back on a level with the tops of the rear seat cushion 11 and the front seat cushion 7, so that a substantially horizontal sleeping surface is provided.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:

1. A hinge comprising a pair of tubular elements, a stud rotatably mounted to and in each element, a first hinge member on one of said studs, a second hinge member on the remaining stud, a hinge pin traversing and swingably connecting said hinge members for relative swinging movement, said members having abutment means at one side of the hinge to prevent relative swinging movement past a certain limit in one direction, said members and studs being rotatable as a unit relative to said tubular elements to dispose said abutment means at the opposite side of the hinge and allow relative swinging movement of said members past said limit in said one direction.

2. In combination a pair of tubular elements adapted to be attached to two otherwise substantially unconnected bodies, first and second hinge members each having a stud rotatably secured in a respective one of said tubular elements, said first hinge member comprising a T-shaped body to the middle of whose cross head the corresponding stud is fastened substantially in alignment with the standard portion, said second hinge member comprising a U-shaped body to the middle of whose bight portion the corresponding stud is fastened projecting in a direction opposite the legs, said legs and said standard portion being of substantially the same size and of generally rectangular shape with said standard portion disposed between the said legs, the edge of both said legs remote from the stud of said second hinge member having one corner thereof reduced and the remaining corner unreduced, the edge of said standard portion remote from the stud of said first hinge member having one corner thereof similarly reduced and its remaining corner similarly unreduced, a pivot traversing said legs and said standard portion adjacent the reduced corners thereof and at points displaced with respect to the axes of the respective studs, whereby the unreduced corners of the legs of said U-shaped hinge member may abut the cross head of said T-shaped hinge member in a certain pivoted position of said hinge member so as to positively prevent relative hinging thereof in one direction while permitting hinging thereof in the opposite direction.

3. In combination a pair of tubular elements adapted to be attached to two otherwise substantially unconnected bodies, first and second hinge members each having a stud rotatably secured in a respective one of said tubular elements, said first hinge member comprising a T-shaped body to the middle of whose cross head the corresponding stud is fastened substantially in alignment with the standard portion, said second hinge member comprising a U-shaped body to the middle of whose bight portion the corresponding stud is fastened projecting in a direction opposite the legs, said legs and said standard portion being of substantially the same size and of generally rectangular shape with said standard portion disposed between the said legs, the edge of both said legs remote from the stud of said second hinge member having one corner thereof reduced and the remaining corner unreduced, the edge of said standard portion remote from the stud of said first hinge member having one corner thereof similarly reduced and its remaining corner similarly unreduced, a pivot traversing said legs and said standard portion adjacent the reduced corners thereof and at points displaced with respect to the axes of the respective studs, whereby the unreduced corners of the legs of said U-shaped hinge member may abut the cross head of said T-shaped hinge member in a certain pivoted position of said hinge member so as to positively prevent relative hinging thereof in one direction while permitting hinging thereof in the opposite direction, said certain position involving axial alignment of said studs and enabling revolving said first and second hinge members as a unit relative to said tubular elements.

4. A hinge comprising a pair of tubular elements, a stud rotatably mounted on each element, a first hinge member fixed on one of said studs, a second hinge member fixed on the remaining stud, a hinge pin traversing and swingably connecting said hinge members for relative swinging movement, said members having stop means to prevent relative swinging movement past a certain point in one direction, said members and studs being rotatable together relative to said tubular elements through substantially 180° to render said stop means ineffective to prevent relative swinging movement of said members in said one direction.

NELS B. BERGE.